Sept. 25, 1962
H. H. PASE
3,055,405
AUTOMATIC TANK-FILLING SYSTEMS
Filed June 23, 1959
5 Sheets-Sheet 1
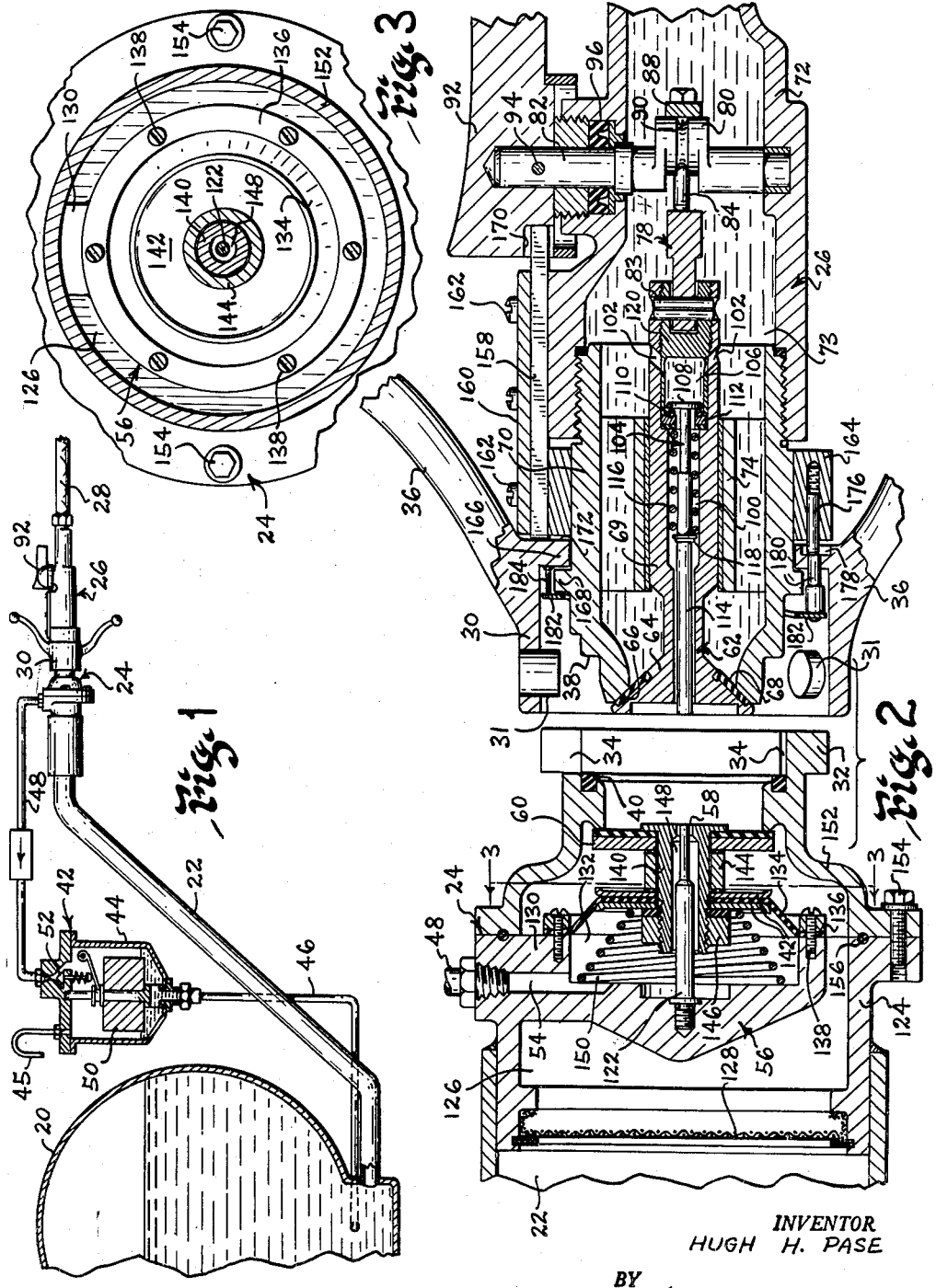
INVENTOR
HUGH H. PASE
BY Steward & Steward
his ATTORNEYS.

Sept. 25, 1962  H. H. PASE  3,055,405
AUTOMATIC TANK-FILLING SYSTEMS
Filed June 23, 1959  5 Sheets-Sheet 2

INVENTOR
HUGH H. PASE
BY Steward & Steward
his ATTORNEYS.

Sept. 25, 1962
H. H. PASE
3,055,405
AUTOMATIC TANK-FILLING SYSTEMS
Filed June 23, 1959
5 Sheets-Sheet 3
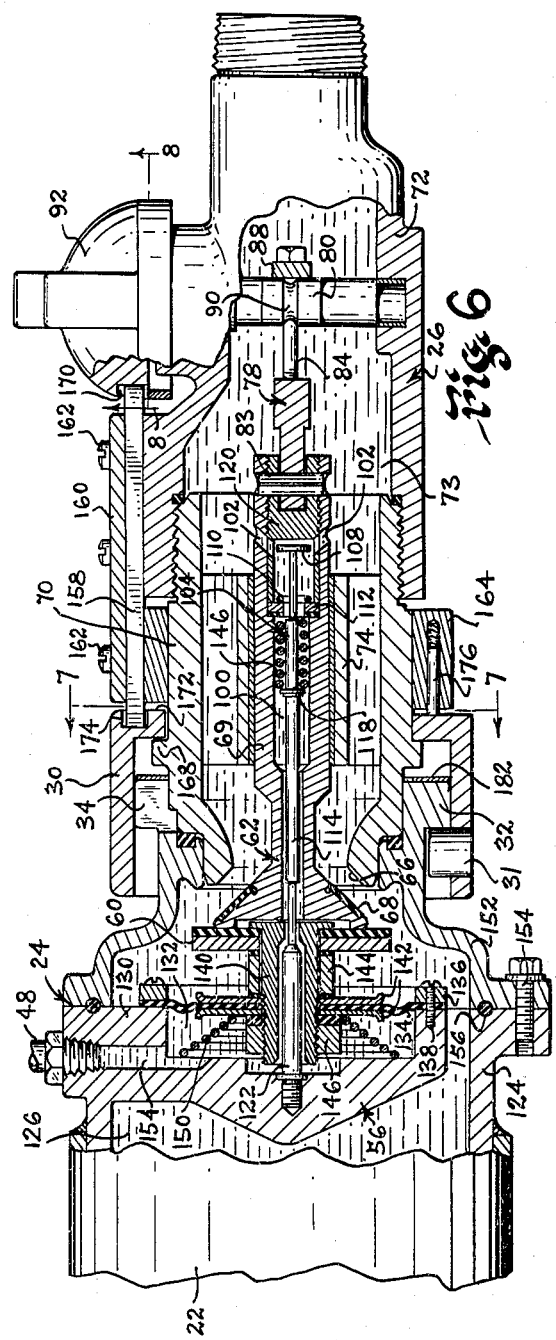
INVENTOR
HUGH H. PASE
BY
Steward & Steward
his ATTORNEYS.

Sept. 25, 1962     H. H. PASE     3,055,405
AUTOMATIC TANK-FILLING SYSTEMS
Filed June 23, 1959     5 Sheets-Sheet 4
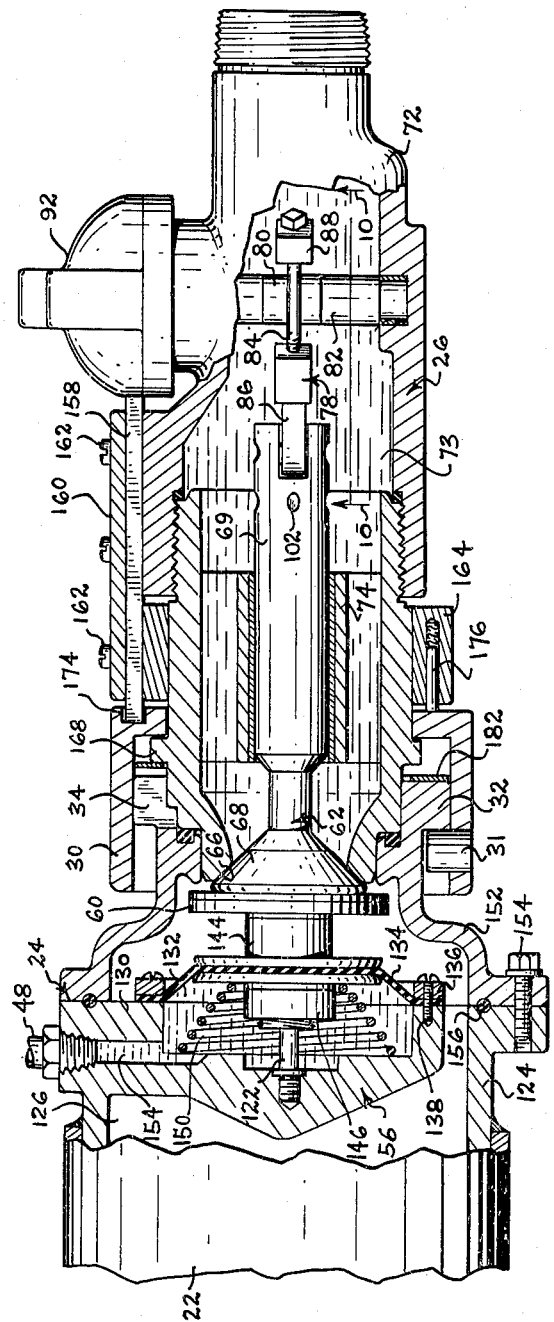
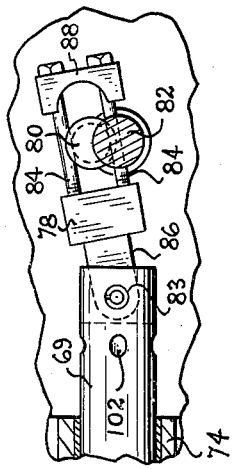
INVENTOR
HUGH H. PASE
BY *Steward & Steward*
his ATTORNEYS.

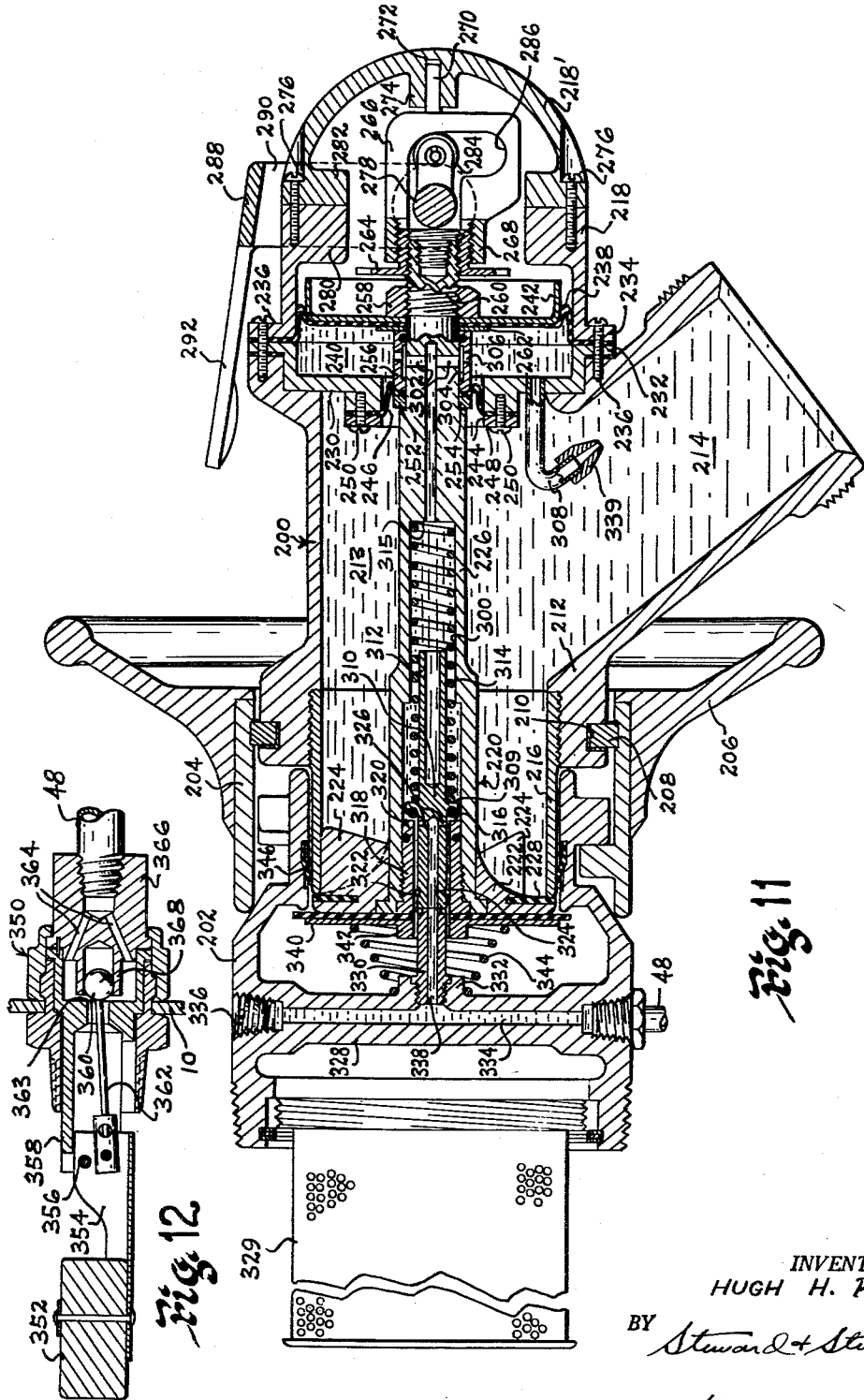

United States Patent Office 3,055,405
Patented Sept. 25, 1962

3,055,405
AUTOMATIC TANK-FILLING SYSTEMS
Hugh H. Pase, Wallingford, Conn., assignor to The
Houston Company, Wallingford, Conn., a corporation
of Connecticut
Filed June 23, 1959, Ser. No. 822,232
15 Claims. (Cl. 141—207)

This invention relates to the handling of fluids and more particularly to automatic tank-filling systems useful, for example, in the refueling of railroad locomotives and ships, as well as in fueling tankers, tank-cars and the like.

Various systems have been employed heretofore for automatically filling tanks so that the nozzle through which the liquid is supplied can be connected to the tank to be filled and left unattended while the tank is filling. Such systems are designed so that the flow of fuel or other liquid is cut off automatically when the tank is full, and in some cases, so-called spill-proof nozzles are employed for the purpose of further avoiding accidental spilling of the liquid. The aircraft industry particularly has employed such systems in order to prevent the dangerous overflow and spilling of highly inflammable fuels. In these systems, in order to obtain the desired automatic control, it is usually necessary to connect control lines, in addition to attaching the fuel nozzle to the tank. Most prior systems of this kind are relatively complicated as well as expensive to manufacture.

It is a primary object of the present invention to provide a tank-filling system which automatically shuts off the flow to the tank when the liquid in the tank reaches a predetermined level, so that it is only necessary to attach the filling nozzle to a coupling device at the tank and to open the nozzle valve permitting flow of the liquid to the tank, the nozzle being left unattended while the tank is filling. Another object of the invention is to provide an automatic tank-filling system of this kind which is mechanically simple in operation and construction, and is relatively inexpensive to manufacture.

In many prior fueling systems a shut-off valve is mounted on or in the tank, the shut-off valve being closed by suitable means when the tank is full in order to stop the flow of liquid to the tank. This places the coupling gasket between the nozzle and coupling member on the tank under pressure, requiring a tight seal in order to prevent leakage around the nozzle. The coupling gasket in certain installations where such a system is employed is therefore subject to considerable wear. In other arrangements, the nozzle, instead of the shut-off valve in the tank, may be automatically turned off when the tank is full. These latter systems, however, have until now required electrical or pressure-operated control devices which must be connected independently of the filling connection, or else they rely on the flow or turbulence of the liquid in the fill-pipe to initiate cut-off of the nozzle.

Still other systems permit pressure to build up in the tank when it is full, and this pressure closes the nozzle valve or tank shut-off valve, thereby eliminating the necessity for an independent pilot or control line. Such systems are complicated by the necessity for means which control the venting of the tank as it is being filled. Moreover, they also require a tight seal between the nozzle and the coupling device at the tank because of the pressure build-up in the tank.

It is accordingly another important object of the present invention to provide an automatic fueling system in which the connection between the nozzle and coupling device at the tank is never under excessive pressure, and in which the control system for closing the nozzle is completed simultaneously with attachment of the nozzle to the fill-pipe on the tank.

To my knowledge no automatic filling system presently developed employ a fluid pressure-differential device acting directly on the nozzle valve for closing such valve. Automatic systems, such as the air-operated nozzles commonly used today in connection with automobile gasoline filling pumps, include a pressure-differential device, but in those systems the device simply releases a tripping mechanism holding the nozzle valve open. This permits the nozzle valve to close almost instantly, which in large capacity filling systems may be extremely harmful and even dangerous due to the impact caused by the sudden stop of the flow of a large quantity of liquid under high pressure. Moreover, the pressure-differential device in such cases does not act directly on the nozzle valve itself in order to open or close it.

Automatic tank-filling apparatus according to the present invention comprises essentially provision of means for forming a pilot-control line between the filling nozzle and a fluid-level responsive pilot valve mounted on the tank. In order to provide smooth operation of the automatic shut-off, the pilot-control line is constructed so that it is independent of the main flow of fluid into the tank. Consequently, turbulence and pressure variations in the fluid as it flows from the nozzle do not affect the control system. The nozzle, which has a main valve for controlling the flow of fluid supplied to it under pressure, is adapted to be attached to a coupling device mounted in a filling opening for the tank. The pilot-control line is formed by two separate sections, one section in the nozzle being automatically connected to the second section in the coupling device at the same time that the nozzle is coupled to the tank. The pilot-control line thus formed provides a passage for the fluid through the nozzle and coupling device to the pilot valve, which is completely separate from the filling passage.

A pressure-differential device located either in the coupling member or in the nozzle is operated by the pressure in the pilot-control line and acts directly on the main-valve in the nozzle to open or close it. When open, the pilot valve, which may be a conventional float-valve, for example, permits a control fluid to flow freely through the pilot-control line into the tank under little or no pressure. However, when the float-valve is closed, pressure builds up in the control line to operate the pressure-differential device of the valve-actuating means. In the specific embodiments of the invention disclosed hereinafter, the fluid control agent is fuel oil supplied under pressure to the nozzle, but it will of course be understood that the source of pressure for actuation of the pressure-differential device could if desired be furnished by an outside supply.

In order to prevent leakage through the pilot passage in the nozzle when the nozzle is not connected to the coupling member, a normally closed cut-off valve is provided in the pilot-line of the nozzle. The cut-off valve is opened upon connection of the nozzle to the coupling member so that the pilot-control line is open between the nozzle and the fluid-level operated valve at the tank. In certain embodiments of the present invention, the cut-off valve in the pilot-line of the nozzle not only prevents leakage of fluid through the open pilot-line, but also acts to maintain pressure in the nozzle portion of the pilot-control line in order to hold the main valve in the nozzle closed independently of manual closing means therefor which may be provided. This will become more apparent from the detailed description hereinafter.

An important advantage of the present invention resides in the positive action of the valve-actuating means for effecting closure of the nozzle valve. Moreover, an independent control system is employed that is not influenced by the flow or turbulence in the coupling or fill-line. This prevents premature closure of the nozzle valve, as well as overfilling of the tank during normal operation. Overfilling is also prevented in case an attempt is made to fuel a tank that is already nearly full.

A further advantage of the present invention lies in the fact that the flow of fuel or other liquid to the tank is cut off by the nozzle-valve rather than by a shut-off valve on the tank or by pressure build-up in the tank. Consequently, the coupling gasket between the nozzle and coupling member is never used to sustain surge or static pressures. In fact, negative pressure or a partial vacuum may be created at the coupling by the flow of fuel from the nozzle into the fill-line, and closure of the nozzle, rather than the shut-off valve, prevents subjecting the coupling to high pressure at any time. Consequently, only a light coupling gasket need be used in the present system, and in certain installations the gasket may even be eliminated entirely.

These and other objects and advantages of the invention, as well as novel features, will become further apparent from the description hereinafter of apparatus embodying the invention in its most advantageous forms, reference being had to the accompanying drawings, in which FIG. 1 is a more or less diagrammatic view of a typical installation embodying the invention;

FIG. 2 is a central longitudinal section through the coupling device and nozzle;

FIG. 3 is a cross-section taken on the line 3—3 of FIG. 2 and looking in the direction of the arrows;

FIGS. 4, 6 and 9 are views similar to FIG. 2, but with the parts shown in different positions, and with certain portions shown in elevation and partially broken away;

FIG. 5 is a cross-section through the nozzle taken on the line 5—5 of FIG. 4;

FIG. 7 is another cross-section through the nozzle but taken on the line 7—7 of FIG. 6.

FIG. 8 is a section of a detail taken on the line 8—8 of FIG. 6;

FIG. 10 is a detail view taken on the line 10—10 of FIG. 9 and looking in the direction of the arrows;

FIG. 11 is a longitudinal section through the coupling device and nozzle of a modified construction, and FIG. 12 is a longitudinal section through a pilot-valve mounted directly on the tank, which may be used for controlling the valve actuating means in place of the pilot-valve shown in FIG. 1.

Figures 4, 5:
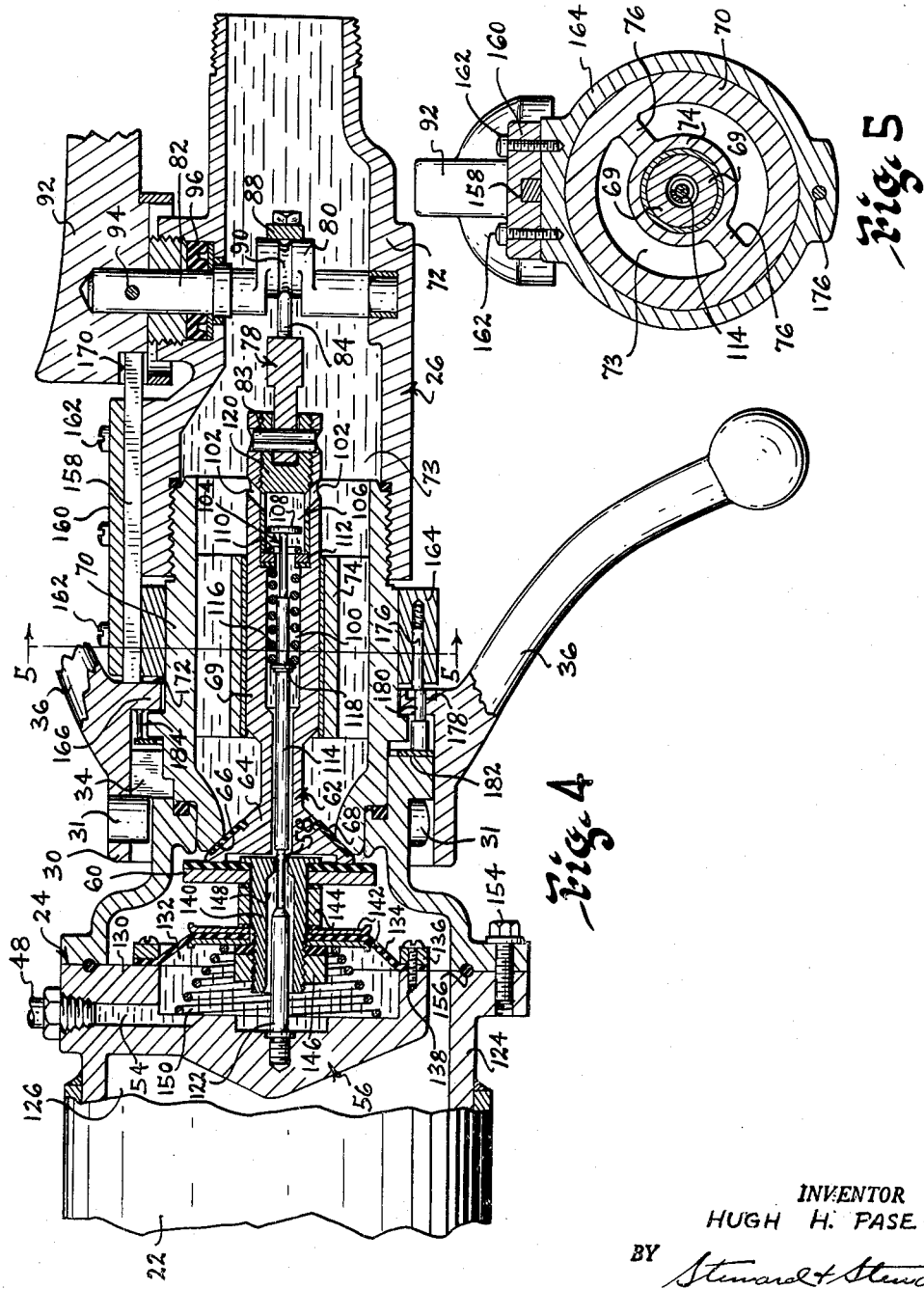

While the drawings illustrate apparatus useful in filling fuel oil tanks, such as railroad tank cars and fuel tanks for diesel locomotives, it will be understood that the invention is applicable for various other automatic tank-filling systems. FIG. 1 shows a fuel tank 20, having a fill-pipe 22 extending from the bottom of the tank to a convenient location to one side where it is provided with a coupling device 24 which is readily accessible for attachment of a nozzle 26 of a fuel hose 28. Fuel is pumped under pressure to nozzle 26 from a suitable supply (not shown). Nozzle 26 is secured to the coupling device 24 by means of a sleeve 30 rotatably mounted on nozzle 26 and having internal lugs 31 which engage behind a flange 32 on the outer end of coupling device 24. FIG. 2 shows the coupling device 24 and nozzle 26 separated slightly with the nozzle in position ready to be attached to the coupling device. Lugs 31 fit through corresponding slots 34 in flange 32, so that upon rotation of sleeve 30 by means of handles 36, 36 formed integrally therewith, lugs 31 will ride in back of flange 32 fastening nozzle 26 securely to member 24. The rear side of flange 32 is desirably provided with cam surfaces adjacent each slot 34 so as to draw nozzle 26 up tight against the coupling device 24 with an annular shoulder 38 on the nozzle pressing against a gasket 40 to form a suitable seal.

A float type pilot-valve 42 is mounted on tank 20 near the top thereof and is operated by the fluid-level in the tank when the tank is nearly full in a more or less conventional manner. As shown, float-valve assembly 42 is mounted outside the tank, but it can be readily installed inside the tank or mounted in the wall of the tank, if desired. Other types of liquid-level sensing devices may also be employed. For example, a pilot-valve adapted for mounting directly on the wall of the tank is shown in FIG. 12 and will be described hereinafter. Pilot-valve 42 has a casing 44 forming a float-chamber connected at its bottom through a line 46 to the bottom of tank 20, with a control-line 48 leading from the top of float-chamber 44. A vent 45 is mounted in the top of chamber 44 to permit the fuel therein to seek a natural level. When the tank is nearly full, the fuel level in the float-chamber 44 lifts a float 50 closing a poppet valve 52 and cutting off control-line 48.

Line 48 is permanently connected to a passage 54 in coupling device 24, which is provided with a pilot-member 56 located internally thereof. Passage 54 is drilled through the side of coupling device 24 into pilot-member 56 and communicates in a manner to be described hereinafter with an aperture 58 in the outer surface of a shut-off valve 60. In this instance valve 60 performs the dual function of closing the fill-pipe 22 to prevent spillage from tank 20 under normal conditions and of closing a main-valve 62 in nozzle 26, in a manner which will become more apparent hereinafter.

The main-valve 62 in the nozzle is a poppet valve having a valve head 64 which seats rearwardly against a valve seat 66 in the nozzle body, a neoprene seal 68 being provided in the rear conical surface of valve head 64 to prevent leakage. A stem 69 of main-valve 62 extends axially into the body of nozzle 26, which consists of a hollow forward section 70, the front end of which forms the nozzle opening and valve seat 66. In addition, coupling sleeve 30 is mounted on and surrounds the forward end of body section 70, which is threadedly secured in a rear body-section 72 to form a main passage 73 in nozzle 26 from the fill-hose 28 connected to the rear end thereof. As may be seen in FIGS. 5 and 7, the stem 69 of the main-valve 62 is supported for axial movement in a cylindrical guide 74 suspended centrally of the passage 73 by means of radial supports 76 formed integrally within the forward section 70 of the nozzle. The rear end of stem 69 is connected by means of a link 78 to a crank 80 on a transverse shaft 82 journaled in opposite sides of the rear section 72 of the nozzle.

Link 78 is pivoted at its forward end to a pin 83 in the rear end of valve stem 69, but is connected to crank 80 in such a manner that main-valve 62 can be opened or closed independently of crank 80 whenever shaft 82 is rotated to unlocked position. To this end, link 78 consists of a stub 85 connected to pin 83 at one end and having a pair of bolts 84, 84 (FIG. 10) threaded into its other end, with bolts 84 extending rearwardly on either side of crank 80. An abutment plate 88 is secured across the free ends of bolts 84, 84 for engagement with crank 80. Abutment plate 88 is spaced a substantially greater distance from the end of stub 86 than the diameter of crank 80, permitting link 78 to slide freely back and forth across crank 80 when the latter is located to one side of center, as shown in FIG. 10. Crank 80 is provided with a central circumferential groove 90 (FIG. 2) which received bolts 84, 84 and keeps link 78 in proper alignment.

It will be seen that the above-described linkage permits the main-valve 62 to open or close whenever the crank 80 is unlocked. However, when it is desired to lock the main-valve 62 closed, the shaft 82 is rotated in order to move crank 80 rearwardly into engagement with abutment plate 88 and over dead-center so that valve 62 is drawn rearwardly and locked closed in the position shown in FIGS. 2 and 4. One end of shaft 82 projects outwardly through the side of the rear section 72 of the nozzle body and is provided with a handle 92 fixed thereto by means of a pin 94. Shaft 82 can therefore be manually operated by means of handle 92 in order to close and unlock main-valve 62. Suitable packing 96 is provided around shaft 82 and held in place by a gland-nut 98, thereby preventing fuel leakage. It will be apparent that in order to ensure tight closure of main-valve 62, bolts 84, 84 can be turned down, thereby drawing the valve further rearwardly against its seat 66 when crank 80 is moved into locking position by means of the main-valve handle 92.

Usually nozzle 26 is filled with fuel under pressure before it is connected to the coupling device 24 at the tank 20. In order to ensure continuous engagement between the shut-off valve 60 and the main-valve 62 when the nozzle is properly connected to the coupling device, the shut-off valve 60 is lifted somewhat off its seat in the coupling device 24 by the head 64 of main-valve 62 which projects slightly beyond the forward end of the nozzle opening when it is closed as shown in FIG. 4. The main-valve 62 is then unlocked by turning handle 92 and moved to open position as shown in FIG. 6 under the pressure of the fuel in the nozzle. This permits fuel to flow as indicated by the shading and arrows in FIG. 6 from the nozzle past the pilot member 56 in coupler 24 into the fill-pipe 22 and tank 20, shut-off valve 60 in the coupling member 24 being forced further open by means of the nozzle main-valve 62 when the latter opens.

Coming now to the automatic control and shut-off of the flow of fuel when the tank is full, the main-valve 62 is provided with a pilot passage 100, which extends longitudinally through the center of its valve stem 69 and opens at the forward end of the main-valve in the center of the valve head 64. Pilot passage 100 coincides with the aperture 58 in the outer surface of shut-off valve 60 so that as soon as the nozzle is attached to the coupling device 24, communication is provided from the pilot passage 100 to the control-line 48 on the tank through passage 54 in the pilot-member 56. Fuel in the main passage 73 of nozzle 26 flows into pilot passage 100 through lateral openings 102 in the valve stem 69 at the inner end thereof.

In order to prevent leakage of fuel through the pilot passage 100 when the nozzle is not connected to the tank coupling 24, a cut-off or control valve 104 is provided in an enlarged section or chamber 106 of passage 100. The valve head 108 seats against a rearwardly facing valve seat 110 comprising a resilient gasket or O-ring fixed to the rear side of an apertured disk 112 rigidly positioned transversely in passage 100 at the forward end of the chamber 106. An elongated stem 114 of valve 104 projects forwardly through passage 100 to the front face of the main-valve head 64 so that the valve 104 can be opened by pressing rearwardly against the end of valve stem 114. A valve spring 116 is compressed between disk 112 and a retaining flange 118 on valve stem 114, thereby maintaining valve 104 normally closed. Stem 114 is smaller in diameter throughout than the inside diameter of pilot passage 100, permitting flow of fuel around the stem 114 when valve 104 is open.

A valve-seat retaining plug 120 is threaded into the rear end of the main-valve stem 69, plug 120 having a hollow cylindrical forward portion surrounding chamber 106 which rests against valve-seat disk 112 to hold it in place, and a solid rear portion through which extends pivot pin 83 for link 78. Apertures coinciding with openings 102 are provided in the wall of the hollow cylindrical portion of retaining plug 120 in order to permit fuel to flow from the main passage 73 in nozzle 26 into chamber 106. In addition, the diameter of the valve head 108 is smaller than the inside diameter of chamber 106 to permit fuel to flow through passage 100 when valve 104 is open.

In order to open the cut-off valve 104 to start the flow of fuel through pilot passage 100 when nozzle is connected to the coupling device 24, an elongated pin or probe 122 is rigidly mounted in the body of pilot-member 56 in coupling device 24 and extends outwardly of said coupling device through the central aperture 58 in shut-off valve 60, engaging the outer end of the valve stem 114 in nozzle 26 and forcing it rearwardly when the latter is connected to the coupling device as shown in FIG. 4. Consequently, upon connecting the nozzle to the tank coupling, valve 104 is immediately opened and a pilot-control line completed to pilot-valve 42 through the juncture of the pilot passage 100 in main-valve 62 with aperture 58 in shut-off valve 60.

In the embodiment of the invention shown in FIGS. 1 to 10, valve-actuating means are provided in the coupling device 24 for the purpose of closing the nozzle-valve 62 when the tank 20 is full, or for maintaining said nozzle-valve closed in case the tank is already full when the fuel nozzle is connected to it. Such valve-actuating means includes a differential-pressure device mounted on the outer side of pilot-member 56 capable of forcing shut-off valve 60 toward its closed position which, in turn, due to direct engagement of the valve 60 with nozzle-valve 62, closes the nozzle-valve and stops the flow of fuel to the tank. Pilot-member 56 is formed as an integral part of the rear portion 124 of coupling device 24, which is rigidly mounted on the end of fill-pipe 22. From the cross-sectional view in FIG. 3, it will be seen that pilot-member 56 is a generally circular member smaller in diameter than the size of the passage 126 through which the fuel flows into fill-pipe 22 from nozzle 26. The fuel will therefore flow freely around member 56 and through a filter screen 128 which may be provided across the passage 126 in back of member 56. A neck portion 130, through which passage 54 is drilled for the pilot-control line, connects the pilot-member 56 to the wall of the coupling member 24.

The outer face of pilot-member 56 is provided with a circular recess or pressure chamber 132, into which passage 54 leads. A flexible diaphragm 134 of suitable non-destructible material, such as neoprene, is provided across the outer side of recess or chamber 132 and is fastened in place by a retaining ring 136, through which extends a plurality of securing screws 138 threaded into the member 56. Diaphragm 134 isolates the chamber 132 from the area 126 surrounding the pilot-member 56. The shut-off valve assembly, of which valve 60 is a part, is supported at the center of diaphragm 134, with a hollow stem-portion 140 extending through the diaphragm into chamber 132. A pair of centrally apertured disks 142 located on opposite sides of diaphragm 134 are mounted on stem portion 140 and spaced from the head of shut-off valve 60 by a collar 144. Disks 142 are pressed securely against collar 144 by a nut 146 threaded onto the inner end of stem-portion 140. It will be seen that by tightening down on nut 146, disks 142 grip the central portion of diaphragm 134 between them. A hollow bore 148 drilled axially through the center of stem-portion 140 and terminating at its outer end in aperture 58, is adapted to permit pin 122 to extend all the way through it for engagement with the stem of pilot-line cut-off valve 104. Moreover, bore 148 is larger in diameter than pin 122 so that fuel can flow freely through it from the pilot-line 100 in the nozzle 26 into the chamber 132 of the differential-pressure device. A coil spring 150 is compressed between the bottom of recess 132 and the rear side of the inner disk 142 of diaphragm 134 continuously urging the shut-off valve assembly toward closed position.

The front portion 152 of coupling device 24, on which the coupling flange 32 is formed, is secured to the rear portion of the coupling device by means of bolts 154, a suitable gasket 156 being provided between the front and rear portions of this device to prevent leakage.

The automatic operation of the system is as follows: Nozzle 26, to which fuel is pumped under pressure, is connected to coupling device 24 and locked in place by rotating sleeve 30 in the proper direction. In doing this, pin 122 in the coupling device 24 presses cut-off valve 104 inwardly of nozzle 26 allowing fuel to flow from the pressure side of nozzle 26 through pilot passage 100 in main-valve 62 to the central bore 148 in the shut-off valve 60 and into chamber 132 of the pressure-differential device. If the tank 20 is not full, fuel will flow through pilot-valve 42 into tank 20 without building up any appreciable pressure in chamber 132 of the valve-actuating device. The main-valve handle 92 on nozzle 26 is moved to the position shown in FIG. 6, in order to unlock main-valve 62 and permit fuel to flow into tank 20 through fill-pipe 22 as hereinbefore described. When the tank is full, the liquid level in pilot-valve 42 raises float 50 closing the valve 52 and cutting off the flow of fuel through control line 48. Fuel is then trapped in chamber 132 of the valve-actuating means and builds up pressure equal to that of the fuel in nozzle 26.

The area of diaphragm 134, against which the pressure of the fuel in chamber 132 is exerted is a predetermined amount larger than the cross-sectional area of the nozzle opening at 66 so that, with the help of spring 150, the resulting force urging shut-off valve 60 to the right as viewed in the drawings is greater than the force exerted by the fuel tending to keep main-valve 62 open. Consequently, under the urge of diaphragm 134 acting as a power piston, shut-off valve 60 moves to the position shown in FIG. 9 closing main-valve 62 in nozzle 26 so that no more fuel is supplied to tank 20. The main-valve 62 is then locked closed by moving the handle 92 back to its initial position as shown in FIG. 4, and the nozzle may be disconnected from the coupling member 24.

If by any chance tank 20 is already full when an attempt is made to fill it, the pilot-valve 42 will be closed so that when the nozzle is attached to the coupling, pressure almost immediately builds up in chamber 132 of the differential-pressure device equal to that in nozzle 26. Upon unlocking the control handle 92 under these conditions, the main-valve 62 remains closed due to the pressure-differential favoring shut-off valve 60, and it is impossible for any fuel to enter the tank. Overfilling of the tank is accordingly positively prevented. The operator is easily able to detect that the tank is already full by noting whether the main-valve handle 92 is free to turn in either direction. If the tank is full, main-valve 62 will be in its rearmost position where it exerts no pressure on crank 80, permitting handle 92 to turn freely.

In order to eliminate any possibility of spilling fuel due to accidental opening of the nozzle valve before the nozzle is fully connected to the coupling member or due to premature removal of the nozzle from the coupling member, a suitable interlock 158 is provided between the main-valve handle 92 and the coupling sleeve 30. Interlock 158 consists of an elongated bar mounted on one side of the rear section 72 of nozzle 26 adjacent handle 92 so as to be slidable in a longitudinal direction. A mounting plate 160 in which interlock bar 158 rides is fastened by means of screws 162 to nozzle section 72 and to a collar 164, which is rigid with the forward section 70 of the nozzle body. Collar 164 retains the coupling sleeve 30 rearwardly of the nozzle, an inwardly formed flange 166 on sleeve 30 being held for rotation between collar 164 and a circumferential rib 168 protruding outwardly from nozzle section 70.

The rear end of interlock bar 158 engages a cam groove 170 in the periphery of control handle 92, best shown in FIG. 8. When handle 92 is in the closed or nozzle-valve-locking position shown in FIGS. 2 and 4, the rear end of the interlock bar 158 will be located in the deep portion of cam groove 170, but when handle 92 is moved toward the open position shown in FIGS. 6, 8 and 9, interlock bar 158 is forced forwardly by the cam surface at the bottom of groove 170. The forward end of interlock bar 158 extends into engagement with the rear face 172 of flanges 166 on coupling sleeve 30. As may be seen in FIGS. 2 and 4, when the coupling sleeve 30 is noted rotated into locking engagement with the coupling member 24, interlock bar 158 fits closely between the surface 172 of sleeve 30 at one end and the deep portion of cam groove 170 in handle 92 at the other end. Handle 92 is therefore positively prevented from being rotated to its open or unlocked position because interlock bar 158 cannot be moved forward. However, upon rotation of coupling sleeve 30 to its coupling position as shown in FIG. 6, a recess 174 in surface 172 is brought into alignment with interlock bar 158, permitting bar 158 to move forwardly so that handle 92 can be rotated to the open position. Conversely, it is apparent from the foregoing that coupling sleeve 30 also cannot be unlocked with respect to coupling device 24 until the handle 92 is rotated to its nozzle valve locking position, due to the fact that the deep portion of cam groove 170 must be in position to permit interlock bar 158 to move rearwardly. However, when the handle 92 is moved to its closed position, the coupling sleeve 30 can be unlocked. The bottom of recess 174 is inclined at one end as indicated in FIG. 7 so as to cam interlock bar 158 to the rear when the sleeve 30 is rotated in a counterclockwise direction as viewed in FIG. 7. It will be apparent that cam groove 170 in the main-valve handle 92 limits to about 90° of rotation the amount which the handle, and therefore crank shaft 82 on which it is fixed, can be moved. From FIG. 8, it will be seen that when the main-valve handle 92 is in the open position, the end of the groove 170 comes into sidewise abutment with the rear end of interlock bar 158, preventing further rotation of the handle in that direction. When the handle 92 is turned to locked position, the opposite or deep end of groove 170 abuts interlock bar 158, preventing further rotation in that direction. At this point crank 80 on shaft 82 is located on, or slightly over, dead-center with respect to the longitudinal axis of main-valve 62, so that the latter is positively held tightly closed against its valve seat 66 in the nozzle body.

Still another safety feature incorporated in the present fueling nozzle is the means for preventing the coupling sleeve 30 from being inadvertently rotated to its locking position when the nozzle is not connected to the coupling device 24. If this were to occur, it would be possible to move the handle 92 to its open position, unlocking the main-valve 62 in nozzle 26, which of course would allow fuel to flow, assuming of course that the fuel in the nozzle is under pressure. In order to prevent this from occuring, a spring-loaded locking pin 176 is provided in the fixed collar 164, pin 176 being urged into a recess 178 (FIGS. 2 and 7) in the rear surface 172 of coupling sleeve 30, thereby normally locking sleeve 30 against rotation.

A plunger 180 extends through flange 166 from the inside of sleeve 30 into recess 178 and into end-to-end engagement with locking pin 176. Plunger 180 is mounted on a circularly shaped metal band 182 which is located within coupling sleeve 30 but surrounds the outer end of the forward section 70 of nozzle 26. Band 182 is staked to sleeve 30 by means of one or two elongated pins 184 secured to the front side of flange 166 at points remote from plunger 180 so as to allow a limited amount of forward and rearward movement of the portion of band 182 on which plunger 180 is mounted. Band 182 is bent so that plunger 180 is normally spaced a substantial distance from rib 168 on nozzle section 70, giving it room move longitudinally of the nozzle 26. When the nozzle is connected to the fill-pipe, flange 32 on the coupling device 24 engages band 182 forcing plunger 180 rearwardly of nozzle 26, which moves locking pin 176 out of recess 178, as shown in FIG. 4. Coupling sleeve 30 is then free to be rotated to its locked position as shown in FIGS. 6 and 9.

It will be seen from the foregoing that the interlocks 158 and 178 virtually preclude any possibility of the nozzle valve being opened either before the nozzle is connected to the coupler or when it is being disconnected therefrom.

Referring again more particularly to the automatic nozzle shut-off operation of the present invention, an important advantage of the invention is that the nozzle valve is not closed so suddenly when the tank is full as to cause damage to the nozzle and fueling hose. In automatic shut-off nozzles devised heretofore employing a trip mechanism, such as the hereinbefore mentioned system for automobile filling stations, the nozzle valve snaps closed so fast when it is tripped that considerable shock is imparted to the hose and working parts of the nozzle. Where relatively small capacities and pressures are involved, such shock is not harmful. However, in fueling railroad tank cars and locomotives or other large capacity systems, the volume of flow is so great and the pressure of the fuel so high that the equipment cannot withstand the impact when the nozzle is instantly cut off. While the flow of fuel into the tank is shut off fairly rapidly in the automatic nozzle specifically disclosed in FIGS. 1 to 10, the closing actuation of the pressure-differential device is slow compared to the tripping-mechanism type of automatic nozzle. Consequently, the fueling hose and nozzle parts are not subjected to the great impact caused by a sudden, virtually instantetous cut-off of flow at the nozzle.

The automatic nozzle valve and shut-off system disclosed in FIGS. 1 to 10 can be adapted to handle almost unlimited capacities of flow and pressures, but where the flow much exceeds 100 gallons per minute and pressures of from 45 to 50 pounds, it has been found impractical in some installations to locate the valve-actuating mechanism in the coupling device. Consequently, certain features of the present invention have been incorporated in a modified nozzle valve in which the valve-actuating mechanism is located on the nozzle assembly rather than in the coupling device as in the case of the arrangement disclosed in FIGS. 1 to 10. FIG. 11 illustrates an assembly in which a pistol-shaped nozzle 200 is shown connected to a coupling device 202 by means of a bayonet-lug type of connection generally similar to that employed in the previously described construction. A coupling sleeve 204 is in this instance provided with a wheel-like coupling handle 206 completely surrounding the forward portion of the nozzle, coupling sleeve 204 being in this instance freely rotatable on the nozzle. A retaining ring 208 secured to the inner surface of sleeve 204 rides in a groove 210 extending circumferentially about the outer cylindrical surface of a central section 212 of the nozzle body.

Central section 212 is generally Y-shaped with a main longitudinal portion 213 and an intake branch 214 formed integrally therewith, the fuel hose (not shown) being connected to branch 214. A cylindrical valve-seat section 216 is threaded to the front end of the main portion 213, while a dome 218 is mounted on the flanged rear end of portion 213 for housing the valve-actuating mechanism. A main poppet-type valve 220 is supported for longitudinal movement axially of main portion 213 of the nozzle, the head 222 of said valve being supported within section 216 by means of a plurality of radially disposed guide-fins 224 extending rearwardly from and integral with the valve head. Guide-fins 224, which are desirably three in number, are equally spaced around the longitudinal axis of valve 220 with their outer edges in sliding engagement with the inner surface of section 216 of the nozzle body. The stem 226 of main-valve 220 extends rearwardly into the dome 218 and is supported at this end in a manner which will be described more fully hereinafter. Main-valve 220 moves forwardly or to the left as viewed in FIG. 11 to open position and rearwardly to its closed position in seating engagement with the front edge or nozzle opening of the cylindrical section 216. A resilient disk-type valve seat 228 is provided on the rear side of valve head 222 in order to prevent leakage when the main-valve is closed.

The rear end of the main body-portion 213 of the nozzle is adapted to receive a centrally apertured cup-shaped partition-member 230 having a peripheral flange 232 fitting against the rear face of the main body-portion 213 between the latter and a peripheral flange 234 on dome 218, which is firmly secured to body-portion 213 by means of a plurality of spaced screws 236 passing through both flanges 232 and 234. A flexible diaphragm 238 is provided across the mouth of the cup-shaped partition 230 to form a pressure chamber 240 for a purpose which will be more apparent hereinafter. The periphery of diaphragm 238 is interposed between flanges 232 and 234 forming a tight seal therewith.

Diaphragm 238 is supported along its rear side by a cup 242 which is rigidly mounted on the end of stem 226 of the main-valve. Diaphragm 238 thus acts as a power piston for moving main-valve 220. A central aperture 244 in partition 230, through which stem 226 extends, is somewhat larger than the stem 226 so as to provide a minimum of resistance to longitudinal movement of main-valve 220. In order to provide a tight seal between partition 230 and valve stem 226 without restricting the movement of the main-valve, a flexible sealing gasket 246 is secured along its periphery to partition 230 by means of an annular plate 248 and mounting screws 250 spaced at intervals along plate 248. The inner edge of gasket 246 is gripped between a ring 252 positioned against a rearwardly facing annular shoulder 254 on stem 226 and a sleeve 256 located within pressure chamber 240, sleeve 256 being forced forwardly against gasket 246 and ring 252 by means of a nut 258 on the threaded rear end 260 of stem 226. Nut 258 engages the rear surface of supporting cup 242 forcing this forwardly on stem 226 against a washer 262, behind which the central portion of diaphragm 238 is located thereby sealing the inner edge of diaphragm 238 on stem 226. Washer 262 in turn engages sleeve 256 forcing it forward into gripping relation with ring 252 sealing gasket 246 between them.

An adjusting nut 264, which is provided with both internal and external threads, is threaded onto the end 260 of stem 226 rearwardly of nut 258. A valve-locking member 266 having an internally threaded boss 268 fitting the externally threaded portion of adjusting nut 264 is screwed thereto. At the rear end of locking member 266 is provided a projection 270, which extends rearwardly into a recess 272 in a boss 274 formed on the inner surface of dome 218 centrally thereof. Boss 274 therefore supports the rear end of main-valve 220 for longitudinal movement only. If desired, the dome 218 may be formed in two parts so as to provide a cap 218' which may be removed by removing screws 276.

Main-valve 220 is locked closed in its rearward position by means of a shaft 278 which is suitably journaled between enlarged flange portions 280 and 282 formed internally of dome 218 at the juncture between its base portion and cap 218'. Centrally of shaft 278 is formed a crank 284, which passes through an L-shaped slot 286 in locking member 266. When shaft 278 is turned counterclockwise as viewed in FIG. 11, crank 284 is moved to the over-center position in which it is shown, engaging the outer edge of slot 286 and locking main-valve 220 closed. When shaft 278 is turned in the opposite direction, crank 284 moves into the transverse leg of slot 286 so that the main-valve is released.

The internal and external threads of adjusting nut 264 are oppositely disposed so that by simply removing cap 218' a suitable tool can be inserted to turn nut 264 in one direction or the other and thereby to reduce or increase the distance from the outer edge of slot 286 in the locking member 266 to the valve seat 228 on the valve head 222. This increases or decreases the force with which the main-valve is held against its seat when it is manually locked closed. Crank 278 is in this instance provided with a yoke-shaped handle 288 having legs 290 which straddle dome 218, legs 290 being rigidly attached to opposite ends of shaft 278. A lever-portion 292 of the handle 288 extends forwardly from legs 290 into overlying position above nozzle 200. When the main-valve is fully open, shaft 278 is rotated clockwise (as viewed in FIG. 11) approximately 90° so that legs 290 of the locking handle extend straight back from the nozzle and lever-portion 292 projects upwardly into a prominent position indicating that the nozzle valve is open.

As in the case of the nozzle disclosed in FIGS. 1 to 10, the main-valve 220 is provided with a pilot passage for the flow of fuel to a control line at the tank. In this instance, a passage 300 is drilled almost the full length of the stem 226 from the front face of valve head 222 to a point adjacent the pressure chamber 240 at the rear of the nozzle. Radial passages 302 are drilled from the closed end of passage 300 outwardly to a circumferential space 304 formed between stem 226 and sleeve 256 with openings 306 leading therefrom into pressure chamber 240. A Pitot tube 308 extends from the lower part of pressure chamber 240 into the fuel stream, providing fluid communication therewith at the juncture of branch 214 with the main-portion 213 of the nozzle body.

In an enlarged portion 309 of pilot passage 300 is provided a cut-off valve 310, which has a spring guide 312 extending rearwardly between the coils of a valve spring 314 which urges cut-off valve 310 closed. Spring 314 bears at its rear end against a forwardly facing shoulder 315 formed in the rear portion of passage 300. A valve seat 316 for valve 310 is provided by the inner end of a hollow sleeve 318 threaded into the open end of the enlarged portion 309 of passage 300. Sleeve 318 receives within it a stem 320 extending forwardly from valve 310, the diameter of stem 320 being somewhat less than the inside diameter of sleeve 318 to form a slightly loose fit therewith. An O-ring packing 322 is provided between stem 320 and sleeve 318 to keep fuel from leaking past the outside of stem 320. A longitudinal passage 324 is drilled from the front end of stem 320 to the head of valve 310, and transverse passages 326 are provided adjacent the inner end of longitudinal passage 324. When valve 310 is moved rearwardly against spring 314, fuel can flow from passage 300 into the space between stem 320 and sleeve 318, through radial passages 326 and into longitudinal passage 324.

From the foregoing, it will be seen that when fuel is supplied to nozzle 200 under pressure before it is connected to coupling device 202, main-valve 220 will of course be positively locked closed with locking handle 288 moved forwardly as far as it will go. Fuel enters pressure chamber 240 through Pitot tube 308 and pilot passage 300 through radial passages 302 and 306, but is trapped there because cut-off valve 310 is closed. The fuel in chamber 240 is therefore under pressure acting on the diaphragm 238 to force main valve 220 rearwardly. The area of diaphragm 238 is greater than the cross-sectional area of the opening for main-valve 220 so that the direction of the resultant longitudinal force on main-valve 220 is toward the rear or closing position. Consequently, even if the valve locking handle were accidentally moved back enough to unlock the main-valve before the nozzle is connected to the coupling device, the pressure-differential in the nozzle would prevent the main-valve from opening.

Coupling device 202 is mounted on the fill-pipe of a fuel tank (not shown) as in the previously described embodiment of the invention and is formed with a cross-piece 328 located diagonally across the inside thereof. Cross-piece 328 corresponds to the pilot member 56 in the coupling device shown in some of FIGS. 1 to 10 and is most desirably integrally formed as by casting with the coupling device 202. The main stream of fuel flowing from nozzle 200 into the coupling will of course pass on both sides of cross-piece 328 through a strainer 329 into the fill-pipe or directly into the tank, depending on where the coupling is mounted for easy access. A hollow actuating pin or probe 330 mounted in a centrally located boss 332 on the outer side of cross-piece 328 extends outwardly of coupling device 202 for end-to-end engagement with the stem 320 of pilot-line cut-off valve 310, pin 330 being of a predetermined length such that valve 310 is forced rearwardly by the probe as soon as nozzle 200 is connected to coupling device 202.

A control passage 334 is drilled completely through the cross-piece 328 of coupling device 202 from one side thereof to the other. Both ends of passage 334 are threaded for pipe fittings, one end being closed off by means of a plug 336, while the other is connected to the control-line 48 which leads to the pilot-valve at the tank, such as the float-valve 42 shown in FIG. 1 or some other fluid level-sensing device mounted on or within the tank. A passage 338 in actuating pin 330 is in direct communication with transverse passage 334, so that upon connecting the nozzle 200 to the coupling device 202, cut-off valve 310 is opened, immediately allowing fuel to flow from the pilot-passage 300 in main-valve 220 into the control-line 48.

If pilot-valve 42 is open, the pressure of the fuel in the pressure chamber 240 in the nozzle is reduced so that the force tending to open main-valve 220 is greater than that tending to close it. Under these conditions, when the main-valve handle 288 is moved back so that crank 284 is located in the transverse slot 286 of locking member 266, the main-valve will be forced forwardly to permit fuel to flow into the tank through coupling device 202. When the tank is filled to the desired level, the pilot-valve 42 shuts off the flow of fuel through the pilot-control line, again raising the pressure of the fuel in the pressure chamber 240 and creating an overbalance of force toward the closed position of main-valve 220. This moves the main-valve back, shutting off the flow of fuel to the tank. In this condition, the pressure in chamber 240 is equal to the static pressure of the fuel in the main body of the nozzle but, because of the greater area of diaphragm 238 than the area of the opening for the main-valve as described hereinabove, the main-valve remains closed.

The speed at which the valve actuating mechanism, namely diaphragm 238, closes main-valve 220 depends on the aperture size of Pitot tube 308. Consequently, in order to control such response, an adapter 339 having the desired aperture size may be removably mounted on the open end of Pitot tube 308. Larger apertures of course increase the rapidity with which the main-valve is closed upon closing of the pilot-valve at the tank, while smaller apertures reduce the closing speed and therefore decrease the impact when the flow of fuel is cut off.

A check valve 340 provided in coupling device 202 is supported for axial movement into and out of closing position by means of actuating pin 330, on which the central hub portion 342 of check valve 340 is adapted to slide. Check valve 340 is urged toward closing position with respect to the mouth of coupling device 202 by means of a coil spring 344, one end of which embraces the boss 332 on cross-piece 328 while the other end resiliently engages the back side of valve 340. In order to prevent fuel pressure being exerted on the gasket 346 between the nozzle and coupling device, it is desirable to design the nozzle and coupling device in such a way that when they are connected together, the check valve 340 is simultaneously lifted slightly off its seat. This, however, is not essential because when the main-valve 220 moves forward under the pressure of the fuel in the nozzle, it forces check valve 340 open against the pressure of spring 344. However, if the outer end of main-valve 220 is spaced from check valve 340 when the nozzle and coupling are connected, fuel will flow from the nozzle before the check valve is opened, and this may cause some pressure to be exerted on the gasket 346. On the other hand, another advantage of "cracking" check valve 340 open when the nozzle is connected is that fuel remaining in the connection is permitted to drain into the fill-pipe after the fuel is shut off.

It is apparent that the coupling device 202 shown in FIG. 11 is considerably simpler in construction and therefore less expensive than the coupling device 24 of the system shown in FIGS. 1 to 10. The construction of FIG. 11, therefore, provides a distinct advantage over the other in that where the system is used by a railroad, for example, a coupling device must be installed on each engine or each tank-car, but only a few nozzles as compared to couplers are required for installation at the fueling stations. Consequently, by reducing the cost of the couplers, the total cost of converting to an automatic fueling system is greatly reduced.

FIG. 12 shows another fluid level-sensing device which may be used in the present fueling system with either of the automatic nozzles specifically disclosed hereinbefore. In this case, pilot-valve 350 is designed for installation directly through the skin of tank 10, with a float 352 secured to the free end of a float-arm 354 pivotally mounted within tank 10 by means of pin 356 to a hollow valve-body 358 suitably secured to the wall of the tank. A ball-valve 360 is provided at the end of a pinion-arm 362, which is pivoted to float-arm 354 adjacent pin 356 so that when float 352 is raised by the level of the fuel in tank 10, ball-valve 360 is drawn against a valve-seat 363 closing the valve. Fuel from control-line 48 flows around ball-valve 360 through passages 364 in a fitting 366 to which line 48 is connected. The inner end of fitting 366 has a hollow central guide-portion 368, in which ball-valve 360 is supported and shielded against a temporary surge of pressure from line 48. It will be apparent that insofar as controlling the operation of the nozzle-valve actuating means is concerned, pilot-valve 350 operates in the same manner as the previously described pilot-valve 42. However, the valve shown in FIG. 12 is designed so that more positive closing action is obtained by means of the pressure in the control-line, which builds up behind ball 360 within guide 368 once the valve is closed by float 352.

It will be noted that in both the nozzle shown in FIGS. 1 to 10 and the one shown in FIG. 11, the pilot-control line is connected to the fluid chamber in the nozzle upstream from the valve seat for the main-valve. Consequently the control system is not affected by turbulence and pressure variations in the filling passages of the nozzle.

While in the embodiments of the invention hereinabove disclosed the pressure-differential device is employed in each case to close the nozzle valve, it will be understood that if desired the main-valve could be arranged so as to be normally urged closed by the pressure of the fuel in the main filling system, in which case the operation of the pilot-valve would be reversed so as to build up pressure in the pilot-control line when the tank is not full for the purpose of opening the main nozzle valve against the pressure of the fuel in the main system. In that event, actuation of the main-valve would be the reverse of that in the two examples described above. Nevertheless, these further modifications, as well as others, clearly come within the scope of the present invention in its broader aspects as defined in the claims which follow.

What is claimed is:

1. In an automatic tank-filling system, a tank having a fluid-pressure controlling, liquid-level sensing device, a coupling device associated with said tank, a nozzle for filling said tank from a supply of liquid, said coupling device and nozzle having filling passages and means for joining said filling passages, and a main-valve disposed within the filling passage of said nozzle for closing the same, the combination therewith comprising: a pilot-member supported within said coupling device and having a control-passage and means connecting said control-passage with said liquid-level sensing device, said main-valve having a pilot-passage for communication with said control-passage, a portion of said main-valve including said pilot-passage being located adjacent to and centrally of the opening of said nozzle for engagement with said pilot-member when said nozzle and coupling device are joined, so as to form a juncture between said main-valve and said pilot-member, said juncture being located substantially centrally of the filling passages in said nozzle and coupling device, pressure-responsive means for actuating said main-valve; said control and pilot passages being joined at the juncture of said main-valve and said pilot member when said nozzle is connected to said coupling device, thereby completing a pilot-control line between said nozzle and said liquid-level sensing device, means for maintaining the communication between said pilot and control passages as the main-valve moves, and means connecting said pilot-control line with a source of fluid under pressure and with said pressure-responsive means such that said pressure-responsive means is operated by the pressure in said pilot-control line under the control of said liquid-level sensing device.

2. The combination defined in claim 1, wherein said means for maintaining communication between said pilot and control passages comprises a hollow member and a spring urging said main-valve in the direction tending to close said main-valve.

3. The combination defined in claim 1, wherein said pressure-responsive actuating means is mounted on said pilot-member in said coupling device and acts on said main-valve through the juncture of said main-valve with said pilot-member.

4. The combination as defined in claim 3, wherein said main-valve is urged toward its open position by the pressure of the liquid in said nozzle, while the pressure exerted by said actuating means is in a direction for closing said main-valve, said nozzle being further provided with manually operable means for locking said main-valve closed.

5. In an automatic tank-filling system, a tank having a fluid-pressure controlling, liquid-level sensing device, a coupling device associated with said tank, a nozzle for filling said tank from a supply of liquid, said coupling device having means for receiving said nozzle, and a main-valve disposed within said nozzle for closing the same, the combination therewith comprising: a control-passage in said coupling device and means connecting said control-passage with said liquid-level sensing device, said nozzle having a pilot-passage communicating with a source of fluid under pressure and a cut-off valve disposed within and normally closing said pilot-passage, means responsive to the connecting of said nozzle to said coupling device for opening said cut-off valve, and pressure-responsive means for actuating said main-valve; said control and pilot-passages being so disposed as to communicate with each other when said nozzle is connected to said coupling device, thereby completing a pilot-control line between said nozzle and said liquid-level sensing device, said pressure-responsive means being in communication with said pilot-control line and controlled by the pressure therein.

6. The combination defined in claim 5, wherein said cut-off valve comprises a spring-loaded poppet valve movable inwardly of said nozzle to open position, said means for opening said cut-off valve comprising an actuating pin on said pilot-member positioned so as to move said cut-off valve inwardly when said nozzle is connected to said coupling device.

7. In an automatic tank-filling system, a tank having a fluid-level responsive valve, a coupling device associated with said tank through which it is filled, a nozzle for supplying liquid under pressure to said coupling device, and means for securing said nozzle to said coupling device, said nozzle having a fluid-chamber and main-valve therein for controlling the flow of liquid supplied thereto under pressure; the combination therewith comprising a valve-actuating member mounted within said coupling device, said main-valve being mounted within the main filling passage of said nozzle for movement longitudinally thereof into and out of nozzle-closing position, one end of said main-valve being located adjacent the nozzle opening for abutting engagement with said valve-actuating member when said nozzle is secured to said coupling device, said main-valve having a central pilot passage open at the outer end of said main-valve and extending longitudinally thereof into communication with said fluid chamber upstream of the nozzle opening, said valve-actuating member having a passage communicating with said central pilot passage when said nozzle is secured to said coupling device, said valve-actuating member being in fluid communication with and controlled by said fluid-level responsive valve and having a portion movable axially of said main-valve for exerting pressure longitudinally against said main-valve in order to actuate said main-valve.

8. An automatic tank-filling system comprising in combination a tank having a filling coupling and a liquid-level sensing device, a nozzle for filling said tank from a supply of liquid, means for securing the nozzle to said coupling, a main-valve disposed within the nozzle for closing the same, valve-actuating means mounted on said nozzle and connected to said main-valve for actuating the same, a pilot-member disposed within said filling coupling for engagement with said main-valve and forming a juncture therewith when the nozzle is secured to said coupling, a pilot-control line extending from said valve-actuating means to said liquid-level sensing device through said juncture, and fluid communication means connecting said valve-actuating means to a supply of fluid under pressure for operating said valve-actuating means under the control of said liquid-level sensing device; said main-valve being of the poppet type with the pressure of the main stream of liquid on said valve tending to move it in one direction, said valve-actuating means comprising a pressure-chamber having a diaphragm disposed such that the pressure in said chamber exerts a force on said main-valve opposite to that exerted on it by the main stream of liquid, the area of said diaphragm and the cross-sectional area of the nozzle opening being so arranged that the total force exerted on said valve in said one direction is less than the total force exerted on it in the opposite direction when the static pressures in said main stream and in said pressure-chamber are equal.

9. An automatic tank-filling system as defined in claim 8, wherein said main-valve is arranged such that the pressure of the liquid in the main stream tends to open the main-valve.

10. An automatic tank-filling system as defined in claim 9, which further includes a manual locking device cooperatively associated with said main-valve for locking it in closed position.

11. An automatic tank-filling system comprising in combination a tank having a filling coupling and a liquid-level sensing device, a nozzle for filling said tank from a supply of liquid, means for securing the nozzle to said coupling, a main-valve disposed within the nozzle for closing the same, valve-actuating means mounted on said nozzle and connected to said main-valve for actuating the same, a pilot-member disposed within said filling coupling for engagement with said main-valve and forming a juncture therewith when the nozzle is secured to said coupling, a pilot-control line extending from said valve-actuating means to said liquid-level sensing device through said juncture, fluid communication means connecting said valve-actuating means to a supply of fluid under pressure for operating said valve-actuating means under the control of said liquid-level sensing device, said main-valve being of the poppet type arranged such that the pressure of the liquid in the main stream tends to open the main-valve, and said valve-actuating means comprising a pressure-chamber having a diaphragm disposed such that the pressure in said chamber exerts a force on said main-valve tending to close it, said fluid communication means comprising a Pitot tube projecting from said pressure-chamber into the main stream of liquid in said nozzle upstream of the nozzle opening.

12. An automatic tank-filling system as defined in claim 11, which further includes a cut-off valve disposed within said main-valve for closing said pilot-control line when said nozzle is not connected to said filling coupling, and means for opening said cut-off valve upon connecting said nozzle to said filling coupling.

13. An automatic tank-filling system comprising in combination a tank having a filling coupling and a liquid-level sensing device, a nozzle for filling said tank from a supply of liquid, means for securing the nozzle to said coupling, a main-valve disposed within the nozzle for closing the same, valve-actuating means mounted on said nozzle and connected to said main-valve for actuating the same, a pilot-member disposed within said filling coupling for engagement with said main-valve and forming a juncture therewith when the nozzle is secured to said coupling, a pilot-control line extending from said valve-actuating means to said liquid-level sensing device through said juncture, fluid communication means connecting said valve-actuating means to a supply of fluid under pressure for operating said valve-actuating means under the control of said liquid-level sensing device, a cut-off valve disposed within said main-valve for closing said pilot-control line when said nozzle is not connected to said filling coupling, and means for opening said cut-off valve upon connecting said nozzle to said filling coupling.

14. An automatic tank-filling system as defined in claim 13, wherein said cut-off valve comprises a spring-loaded poppet valve movable inwardly of said nozzle to open position, said means for opening said cut-off valve comprising an actuating pin on said pilot-member positioned so as to move said cut-off valve inwardly when said nozzle is connected to said filling coupling.

15. An automatic nozzle for filling a tank comprising in combination a housing having a filling passage, a main-valve for controlling the flow of liquid through said filling passage, said main-valve being disposed so that the pressure of the liquid tends to move said valve in one direction, a pilot-control passage adapted and arranged to be connected to a source of fluid under pressure and to a liquid-level sensing device at said tank, and valve-actuating means having a pressure-chamber in communication with said pilot-control passage and having a movable surface associated with said main-valve and disposed such that the pressure in said chamber exerts a force on said main-valve opposite to that exerted on it by the liquid in said filling passage, the effective area of said surface and the effective area of said main-valve, on which the pressure of the liquid in said filling passage is exerted, being so arranged that the total force exerted on said valve in said one direction is less than the total force exerted on it in the opposite direction when the static pressures in said filling passage and in said pressure-chamber are respectively applied.

References Cited in the file of this patent

UNITED STATES PATENTS

| | | |
|---|---|---|
| 2,041,735 | Young | May 26, 1936 |
| 2,548,368 | Hartley et al. | Apr. 10, 1951 |
| 2,703,096 | Overbeke et al. | Mar. 1, 1955 |
| 2,840,122 | Klikunas et al. | June 24, 1958 |
| 2,845,965 | Rittenhouse | Aug. 5, 1958 |
| 2,901,008 | Cavett et al. | Aug. 25, 1959 |